United States Patent
Herrada

(10) Patent No.: US 11,440,507 B2
(45) Date of Patent: Sep. 13, 2022

(54) GEARMOTOR FOR AUTOMOTIVE VEHICLE WIPER SYSTEM

(71) Applicant: Valeo Systèmes d'Essuyage, Le Mesnil Saint Denis (FR)

(72) Inventor: Jose Luis Herrada, La Verriere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 246 days.

(21) Appl. No.: 16/212,005

(22) Filed: Dec. 6, 2018

(65) Prior Publication Data
US 2019/0176763 A1 Jun. 13, 2019

(30) Foreign Application Priority Data
Dec. 8, 2017 (FR) ...................................... 1761817

(51) Int. Cl.
*B60S 1/26* (2006.01)
*F16H 1/16* (2006.01)
(Continued)

(52) U.S. Cl.
CPC . *B60S 1/26* (2013.01); *B60S 1/08* (2013.01); *B60S 1/166* (2013.01); *F16H 1/16* (2013.01);
(Continued)

(58) Field of Classification Search
CPC .... B60S 1/26; B60S 1/166; B60S 1/08; F16H 57/0415; F16H 57/0498; F16H 57/039;
(Continued)

(56) References Cited

U.S. PATENT DOCUMENTS

| 2009/0136357 A1* | 5/2009 | Vadillo | F04D 29/281 416/244 R |
| 2018/0072933 A1* | 3/2018 | Lai | C09D 7/69 |
| 2018/0086308 A1* | 3/2018 | Kimura | H02K 11/33 |

FOREIGN PATENT DOCUMENTS

| DE | 10 2012 105748 A1 | 1/2014 |
| DE | 10 2012 211080 A1 | 1/2014 |
| DE | 102012211080 A1 * | 1/2014 ......... F16H 57/0416 |

OTHER PUBLICATIONS

Preliminary Search Report in corresponding French Application No. 1761817, dated Jun. 26, 2018 (2 pages).

* cited by examiner

*Primary Examiner* — Katina N. Henson
(74) *Attorney, Agent, or Firm* — Osha Bergman Watanabe & Burton LLP

(57) ABSTRACT

The invention relates to a geared motor (1) for a motor-vehicle wiping system comprising an electric motor (2) comprising a rotor (20) including magnetic elements, a stator (21) having the electromagnetic excitation windings of the rotor, a rotary shaft (22) rigidly connected to the rotor, a reduction gear (3) linking the rotary shaft (22) and an output shaft of the geared motor, a casing (4) forming a protective envelope for said reduction gear, or the electric motor (2), and in which said reduction gear (3) includes a worm screw and worm wheel gear, the worm screw (30) being rigidly connected to the rotary shaft of the rotor (22), the worm wheel (31) rigidly connected to an output shaft (8) of the geared motor, bearing means (23, 24) for guiding the rotary shaft of the rotor (22) in rotation in relation to the casing (4), and potentially, a determination device for determining the angular position of the rotor including a multi-pole magnet (5) that is rigidly connected to the rotary shaft (22) of the rotor (20).

11 Claims, 2 Drawing Sheets

Figure 1:
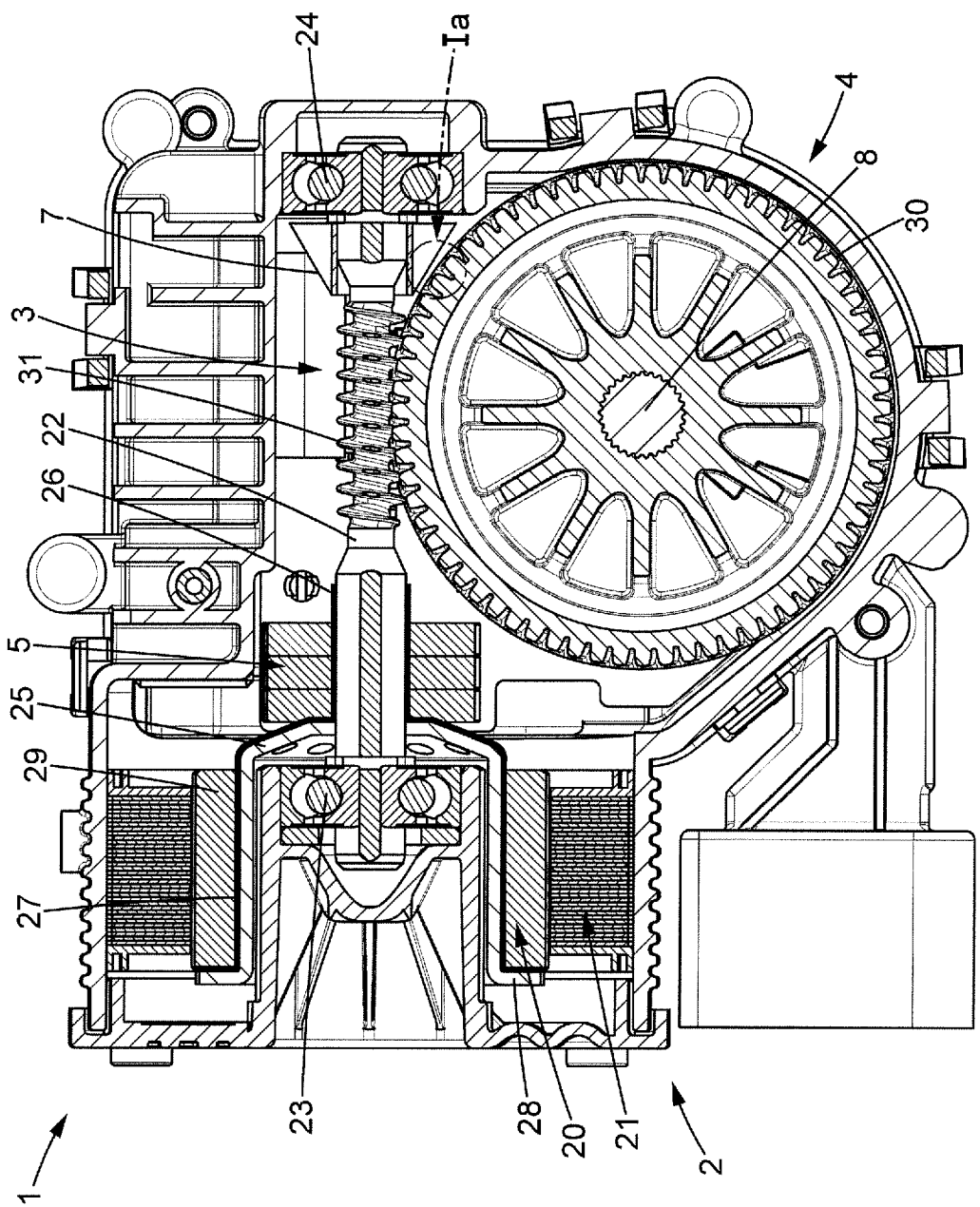

(51) Int. Cl.
    *H02K 7/116*       (2006.01)
    *F16H 57/04*        (2010.01)
    *B60S 1/16*         (2006.01)
    *H02K 11/215*      (2016.01)
    *B60S 1/08*         (2006.01)
    *F16H 57/039*      (2012.01)
    *H02K 7/08*        (2006.01)
    *H02K 9/06*        (2006.01)
    *H02K 21/14*       (2006.01)
    *F16H 57/02*       (2012.01)

(52) U.S. Cl.
    CPC ....... *F16H 57/039* (2013.01); *F16H 57/0412* (2013.01); *F16H 57/0415* (2013.01); *F16H 57/0476* (2013.01); *F16H 57/0498* (2013.01); *H02K 7/085* (2013.01); *H02K 7/1166* (2013.01); *H02K 9/06* (2013.01); *H02K 11/215* (2016.01); *H02K 21/14* (2013.01); *F16H 2057/02034* (2013.01); *F16H 2057/02082* (2013.01)

(58) Field of Classification Search
    CPC .... F16H 57/0412; F16H 57/0476; F16H 1/16; F16H 2057/02034; F16H 2057/02082; F16H 57/0417; H02K 11/215; H02K 7/085; H02K 9/06; H02K 21/14; H02K 7/1166
    USPC .............. 15/250.3; 310/64, 83, 99; 165/80.3
    See application file for complete search history.

GEARMOTOR FOR AUTOMOTIVE VEHICLE WIPER SYSTEM

The invention relates to a geared motor for a motor-vehicle wiping system

Geared motors essentially comprise an electric motor coupled to a reduction gear used to gear down the speed to obtain a significant rotational transmission torque.

Different types of electric motors can be used in a geared motor, notably direct-current brushless electric motors, which have numerous advantages such as a long service life, small size, low power consumption and low noise levels.

Such geared motors are in particular used in motor-vehicle wiping systems including one or more wiper blades, a linkage mechanism for driving the wiper blade or blades in a to-and-fro movement, said output shaft of the geared motor driving the linkage mechanism of the wiping system.

The reduction gear is often a worm gear, the worm screw typically being made of metal and being rigidly connected to the rotary shaft of the rotor, the worm wheel being rigidly connected to the output shaft of the geared motor, which is typically made of plastic.

Two or three bearings, such as ball bearings, are typically used to guide the rotary shaft in rotation, each ball bearing having an inner ring and an outer ring, and the balls being designed to roll in a raceway of the inner ring and in a raceway of the outer ring.

According to the inventor, it should also be noted that a reduction gear comprising a worm gear has a low power transmission efficiency, approximately 65%, with the lost power (i.e. 35%) being dissipated in the form of heat in the worm screw and the metal rotary shaft. In the opinion of the inventor, the cooling for the geared motors known in the prior art could be significantly improved.

The purpose of the present invention is to overcome the aforementioned drawbacks by proposing a worm-drive geared motor with optimized cooling.

Another purpose of the present invention is to propose such a geared motor that is compact along the longitudinal axis of the rotary shaft.

Other purposes and advantages are set out in the description, which is given by way of non-limiting example.

The invention also relates to a geared motor for a motor-vehicle wiping system comprising:
an electric motor including:
  a rotor including magnetic elements,
  a stator having the electromagnetic excitation windings of the rotor,
  a rotary shaft rigidly connected to the rotor,
  a reduction gear linking the rotary shaft and an output shaft of the geared motor,
  a casing forming a protective envelope for said reduction gear, or the electric motor,
  and in which said reduction gear includes a worm gear system, the worm screw being rigidly connected to the rotary shaft of the rotor, the worm wheel (31) rigidly connected to an output shaft of the geared motor,
  bearing means for guiding the rotary shaft of the rotor in rotation in relation to the casing,
  potentially, a determination device for determining the angular position of the rotor including a multi-pole magnet that is rigidly connected to the rotary shaft of the rotor, According to the invention, the geared motor includes at least one heat sink in the form of an element projecting radially from the rotary shaft that is distinct from the bearing means and distinct from the multi-pole magnet, where present, and in which said bearing means include a bearing for guiding the end of the rotary shaft opposite the stator-side of the electric motor in the direction of the rotary shaft, and with reference to said worm screw and in which said heat sink is arranged close to the worm screw on said rotary shaft, in an intermediate position between the worm screw and said bearing on the side of the electric motor opposite the stator, said heat sink having an internal bush for assembling the rotary shaft, said element being designed to form a heat-exchange surface with the internal atmosphere of the casing, and in which said heat sink has a peripheral surface positioned locally facing the worm wheel and inclined in relation to the axis of the rotary shaft such as to be locally oriented substantially tangentially to the worm wheel.

According to optional features of the invention, taken individually or in combination:
  said heat sink is arranged in the immediate vicinity of the worm wheel, said peripheral surface positioned at a distance Δ equal to or less than 4 mm from the worm wheel 31 when same is in rotation, preferably equal to or less than 3 mm,
  the widthwise dimension of the heat sink along the axis of the rotary shaft is equal to or greater than 0.8 times the diameter of the rotary shaft at the level of the heat sink,
  the heat sink is made of a material with thermal conductivity equal to or greater than 1 $W·m^{-1}·K^{-1}$,
  the material used to make said at least one heat sink is metal or alternatively the material used to make said at least one heat sink is a plastic reinforced with metal particles,
  the external diameter of the bearing means is D and the external diameter of said heat sink is equal to or greater than 0.6 D,
  said bearing means include a bearing for guiding the rotary shaft on the stator-side of the electric motor with reference to said worm screw 30, referred to as the stator-side roller bearing,
  the bearing means comprise exclusively the stator-side bearing and the bearing (24) on the side opposite the stator, for guiding the two ends of the rotary shaft respectively,
  said heat sink has fins,
  the fins are arranged about the axis of rotation of the heat sink and designed to form ventilation blades constrained to rotate with the rotary shaft.

The invention also relates to a motor-vehicle wiping system including one or more wiper blades, a linkage mechanism for driving the wiper blade or blades in a to-and-fro movement, as well as a geared motor according to the invention, in which the output shaft drives the linkage mechanism.

Figure 1A:
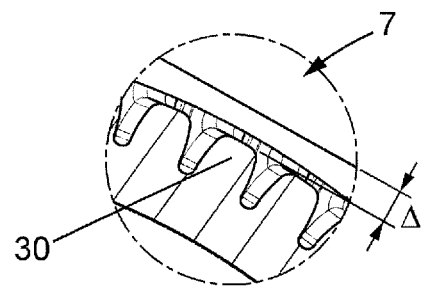
Figure 2:
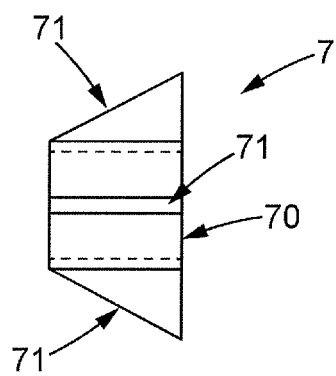
Figure 3:
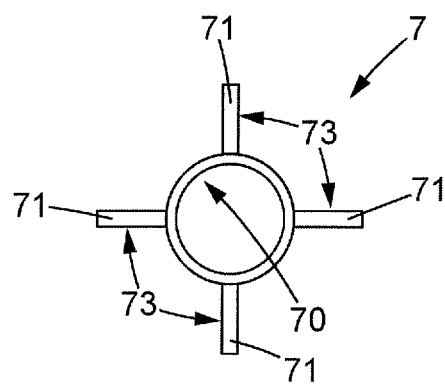

The invention can be better understood by reading the description below, accompanied by the attached drawings, in which:

FIG. 1 is a cross section taken along a plane parallel to the axis of the rotary shaft of the motor, showing the geared motor according to one embodiment of the invention, including the stator, the rotor and the rotary shaft, the worm gear, said multi-pole magnet that is notably rigidly connected to the rotary shaft, the heat sink in the form of a solid element arranged close to the worm screw, arranged between the worm screw and the bearing used to guide the end of the rotary shaft located on the side opposite the stator, FIG. 1*a* is a detailed view of the frame in FIG. 1, showing the distance Δ between the heat sink and the worm wheel, FIGS. 2 and 3 are side and front views of a finned heat sink that can be used instead of the solid heat sink shown in the geared motor in FIG. 1, The invention also relates to a geared motor 1 for a motor-vehicle wiping system comprising:
- an electric motor 2 including:
  - a rotor 20 bearing magnetic elements 29, such as permanent magnets,
  - a stator 21 having the electromagnetic excitation windings of the rotor,
  - a rotary shaft 22 rigidly connected to the rotor,
- a reduction gear 3 linking the rotary shaft 22 and an output shaft 8 of the geared motor, A casing 4, typically made of metal, can form a protective envelope for said reduction gear 3, or the electric motor 2.

The electric motor can be a direct-current brushless motor. Such a motor includes a determination device for determining the angular position of the rotor 20 in relation to the stator 21. A control unit (not shown) is designed to generate control signals to power the electromagnetic excitation windings of the stator 21 as a function of the angular position of the rotor as determined by the determination device for determining the angular position of the rotor.

The geared motor can include a determination device for determining the angular position of the rotor that includes for this purpose a multi-pole magnet 5 constrained to rotate with the rotor, and one or more Hall-effect sensors (not shown) that are in static positions and are designed to detect changes in the magnetic domains of the multi-pole magnet during rotation of the rotor.

The reduction gear 3 includes a worm screw 30 and a worn wheel 31 gear, the worm screw being rigidly connected to the rotary shaft 22 of the rotor 20, the worm wheel 31 being rigidly connected to an output shaft 8 of the geared motor. This output shaft 8 is substantially perpendicular to the rotary shaft 22 of the electric motor 2. The thread of the worm screw 30 can be obtained from the material of the rotary shaft 22, which is typically made of metal. The worm wheel 31 is typically made of plastic.

The rotary shaft of the rotor 22 is guided in rotation in relation to the casing 4 by bearing means 23, 24. The bearings 23, 24 used can be roller bearings, bushings or any other form of bearing known to the person skilled in the art.

In such a geared motor 1, the friction generated between the worm screw 30 and the worm wheel 31 of the reduction gear 3 cause significant heating of the worm screw and of the rotary shaft 22.

The invention is however intended to optimize cooling of the worm screw 30 and of the rotary shaft 22 of the electric motor 2.

Notably, the geared motor 1 includes a heat sink 7 in the form of an element projecting radially from the rotary shaft 22 that is distinct from the bearing means 23, 24 and distinct from the multi-pole magnet 5, where present. This heat sink 7 has an internal bush 70 for assembling the rotary shaft 22, said element being designed to form a heat-exchange surface with the internal atmosphere of the casing 4.

Furthermore, said bearing means include a bearing 24 for guiding the end of the rotary shaft opposite the side of the electric motor 2 with the stator 21 in the direction of the rotary shaft 22, with reference to said worm screw 30. According to the invention, said heat sink 7 is arranged close to the worm screw 30 on said rotary shaft 22, in an intermediate position between the worm screw 30 and said bearing 24 on the side opposite the stator of the electric motor 2.

When in operation, the heat sink 7 is designed to remove heat from the rotary shaft 22, in the vicinity of the worm screw 30, from the internal bush 70 thereof and to transmit the calories radially as far as the heat exchange surface of said element, which can be cooled by the internal atmosphere.

Furthermore, said heat sink 7 has a peripheral surface 71 positioned locally facing the worm wheel 31 and inclined in relation to the axis of the rotary shaft 22 such as to be locally oriented substantially tangentially to the worm wheel 31.

Said heat sink 7 is arranged in the immediate vicinity of the worm wheel 31, said peripheral surface 71 positioned at a distance Δ preferably equal to or less than 4 mm from the worm wheel 31 when same is in rotation, in particular equal to or less than 3 mm, or equal to or less than 2 mm.

This inclined peripheral surface 71 helps to maximize the exchange surface of the element forming the heat sink by positioning said projecting element as close as possible to the worm wheel 31. The width 1 of said heat sink 7, i.e. the dimension of the heat sink along the direction of the rotary shaft can be equal to or greater than 0.8 times the diameter of the rotary shaft at the level of the heat sink (7).

The heat sink can be made of a material with thermal conductivity equal to or greater than 1 $W \cdot m^{-1} \cdot K^{-1}$, In particular, the material used to make said heat sink 7 can be metal. The material can also be plastic reinforced with metal particles.

The external diameter of the bearing means is D and the external diameter of said heat sink 7 can be equal to or greater than 0.6 D, for example equal to or greater than 0.7 D or even greater than 0.8 D. The external diameter of said heat sink 7 can be equal to or less than 1.5 D, for example equal to or less than 1.3 D.

Said heat sink 7 can also have fins 73 forming the exchange surface with the internal atmosphere. According to one embodiment, the fins 73 can be arranged about the axis of rotation of the heat sink 7 and designed to form ventilation blades constrained to rotate with the rotary shaft 22. For example, during movement of the rotary shaft 22 about the axis thereof, the ventilation blades are designed to create a pulsed air flow.

Said bearing means 23, 24 can include a bearing 23 for guiding the rotary shaft on the side of the electric motor 2 with the stator 21 with reference to said worm screw 30, referred to as the stator-side roller bearing. According to one embodiment, the bearing means comprise exclusively the stator-side bearing 23 and the bearing 24 on the side opposite the stator, these two bearings 23, 24 guiding the two ends of the rotary shaft 22 respectively.

Notably, the stator-side guide bearing 23 can be arranged inside the rotor 20 and stator 21 assembly, seated in a recess inside the rotor 20. This end of the rotary shaft can thus advantageously be guided by the bearing 23 without requiring a shaft long enough to ensure that the end thereof projects beyond the rotor. Furthermore, the assembly of this bearing 23 inside the rotor does not require a journal on the usable lengthwise section of the rotary shaft outside the rotor, which is already in use for bearing the worm screw and/or for bearing the polar magnet 5. This lengthwise section of the shaft outside the rotor can be minimized in order to increase the compactness of the geared motor in this direction.

For this purpose, a hollow support 25 can bear said magnetic elements 29 about the circumference thereof and is arranged coaxial to and constrained to rotate with the rotary shaft 22. Advantageously, this hollow support 25 covers said bearing 23, which guides the longitudinal end of the rotary shaft 22 on the stator-side of the electric motor 2.

This hollow support 25 can still extend axially beyond the longitudinal end of the rotary shaft 22, on the stator-side of the electric motor. This in particular enables said magnetic elements 29 of the rotor to be arranged at least partially beyond the longitudinal end of the rotary shaft 22, as shown by way of example in FIG. 3. This hollow support is for example a body of revolution that includes a hollow tubular portion with an internal diameter able to contain the bearing 23 or a projecting portion of the casing 4.

This hollow support 25 can also include a sleeve 26 enabling the hollow support 25 to be attached to the rotary shaft 22. This sleeve 26 is attached in an intermediate position on the rotary shaft 22 between the reduction gear 3 and the bearing 23. The internal diameter of the sleeve 26 can be adjusted to the external diameter of the rotary shaft in this intermediate position. This may be a tight fit enabling shrink fitting between the hollow support 25 and said rotary shaft 22. This sleeve 26 can also be attached to the shaft 22 by gluing.

The multi-pole magnet 5 can be in the form of a ring assembled about the rotary shaft. The magnetic domains (north/south) extend alternately about the circumference of the ring. This multi-pole magnet 5 can be rigidly connected to said hollow support 25 and arranged about said sleeve 26 for attaching said hollow support 25.

Said hollow support 25 has a lengthwise support section 27 bearing the magnetic elements 29. This lengthwise support section 27 is substantially cylindrical. The magnetic elements 29 of the rotor are rigidly connected to the outer wall of the cylinder. A shoulder 28, in particular in the form of a ring, can extend radially outwards at the distal end of said lengthwise support section 27 bearing the magnetic elements. This shoulder 28 forms a lateral stop for said magnetic elements 29 of the rotor 20. This shoulder 28 facilitates alignment of the magnetic elements along a single diametral line.

Furthermore, the hollow support 25 has a lengthwise linking section linking the sleeve 26 and said cylindrical lengthwise support section 27, which has a larger diameter than the sleeve 26.

The hollow support 25 can essentially comprise a one-piece element, in particular a metal sheet shaped to form, consecutively, the sleeve 26, the linking section, the cylindrical support section 27, or said shoulder 28.

The invention also relates to a motor-vehicle wiping system including one or more wiper blades, a linkage mechanism for driving the wiper blade or blades in a to-and-fro movement, as well as a geared motor according to the invention, in which the output shaft 8 drives the linkage mechanism.

NOMENCLATURE

1. Geared motor
2. Electric motor
20. Rotor
21. Stator
22. Rotary shaft
23, 24. Bearings, respectively the roller bearing on the stator-side of the electric motor and the roller bearing opposite the stator-side of the electric motor
3. Reduction gear
30. Worm screw
31. Worm wheel
4. Casing
5. Multi-pole magnet
7. Heat sinks arranged between the bearing opposite the stator-side of the electric motor and the worm screw
70. Internal bush of the heat sink for assembly of the rotary shaft
71. Inclined peripheral surface located in the immediate vicinity of the worm wheel
72. Internal peripheral support for the ring of the multi-pole magnet
73. Fins, notably ventilation blades
Δ. Distance separating the worm wheel from the heat sink

The invention claimed is:

1. A geared motor for a motor-vehicle wiping system comprising:
   an electric motor including:
   a rotor including magnetic elements,
   a stator having an electromagnetic excitation windings of the rotor,
   a rotary shaft rigidly connected to the rotor,
   a reduction gear linking the rotary shaft and an output shaft of the geared motor,
   a casing forming a protective envelope for said reduction gear, or the electric motor,
   wherein said reduction gear includes a worm screw and a worm wheel gear, the worm screw being rigidly connected to the rotary shaft of the rotor, the worm wheel gear being rigidly connected to the output shaft of the geared motor,
   bearing means for guiding the rotary shaft of the rotor in rotation in relation to the casing, and
      a determination device for determining an angular position of the rotor including a multi-pole magnet that is rigidly connected to the rotary shaft of the rotor;
   at least one heat sink in the form of an element projecting radially from the rotary shaft that is distinct from the bearing means and distinct from the multi-pole magnet; and
   a hollow support attached proximate a longitudinal end of the rotary shaft and arranged coaxial to and constrained to rotate with the rotary shaft, wherein the hollow support bears said magnetic elements about a circumference thereof,
   wherein said hollow support comprises a sleeve for attachment with said rotary shaft,
   wherein said bearing means include a bearing for guiding an end of the rotary shaft opposite a stator-side of the electric motor in a direction of the rotary shaft, and with reference to said worm screw and in which the at least one heat sink is arranged close to the worm screw on said rotary shaft, in an intermediate position between the worm screw and said bearing on a side opposite the stator of the electric motor, the at least one heat sink having an internal bush for assembling the rotary shaft, the at least one heat sink forming a heat-exchange surface with an internal atmosphere of the casing,
   wherein the at least one heat sink has a peripheral surface positioned locally facing the worm wheel and inclined in relation to an axis of the rotary shaft such as to be locally oriented substantially tangentially to the worm wheel,
   wherein the at least one heat sink has fins arranged along and parallel to the longitudinal axis of the rotary shaft and perpendicular to the rotary shaft.

2. The geared motor according to claim 1, wherein the at least one heat sink is arranged in an immediate vicinity of the worm wheel, said peripheral surface positioned at a distance equal to or less than 4 mm from the worm wheel when the worm wheel is in rotation.

3. The geared motor according to claim 1, wherein the at least one heat sink is made of a material with thermal conductivity equal to or greater than 1 W·m$^{-1}$·K$^{-1}$.

4. The geared motor according to claim 3, wherein the material used to make the at least one heat sink is metal.

5. The geared motor according to claim 3, wherein the material used to make the at least one heat sink is a plastic reinforced with metal particles.

6. The geared motor according to claim 1, wherein said bearing means include a bearing for guiding the rotary shaft on a side of the electric motor with the stator with reference to said worm screw, referred to as a stator-side bearing.

7. The geared motor according to claim 6, wherein the bearing means comprise exclusively the stator-side bearing and the bearing on the side opposite the stator, for guiding two ends of the rotary shaft respectively.

8. The geared motor according to claim 1, wherein the fins are arranged about an axis of rotation of the at least one heat sink and form ventilation blades constrained to rotate with the rotary shaft.

9. The geared motor according to claim 1, wherein said hollow support covers said bearing.

10. The geared motor according to claim 1, wherein said hollow support extends axially beyond the longitudinal end of said rotary shaft such that said magnetic elements are arranged at least partially beyond the longitudinal end of said rotary shaft.

11. The geared motor according to claim 1, wherein said sleeve is attached in an intermediate position on said rotary shaft between said reduction gear and said bearing.

\* \* \* \* \*